(12) United States Patent
Phillips

(10) Patent No.: US 9,461,945 B2
(45) Date of Patent: Oct. 4, 2016

(54) AUTOMATED MESSAGING RESPONSE

(71) Applicant: Jeffrey P. Phillips, Alpine, UT (US)

(72) Inventor: Jeffrey P. Phillips, Alpine, UT (US)

( * ) Notice: Subject to any disclaimer, the term of this patent is extended or adjusted under 35 U.S.C. 154(b) by 224 days.

(21) Appl. No.: 14/057,338

(22) Filed: Oct. 18, 2013

(65) Prior Publication Data

US 2015/0113435 A1    Apr. 23, 2015

(51) Int. Cl.
*H04L 12/58* (2006.01)
*G06F 17/28* (2006.01)
*G06F 17/27* (2006.01)
*G06F 3/0482* (2013.01)

(52) U.S. Cl.
CPC ............ *H04L 51/02* (2013.01); *G06F 3/0482* (2013.01); *G06F 17/27* (2013.01); *G06F 17/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,044,134 A * | 3/2000 | De La Huerga | .. | H04M 3/53333 379/88.08 |
| 7,421,658 B1 * | 9/2008 | Sharma | ............... | G06F 9/45512 715/733 |
| 8,495,047 B2 | 7/2013 | Bookstaff | | |
| 2002/0181671 A1 * | 12/2002 | Logan | ............. | H04M 1/274575 379/88.13 |
| 2003/0228002 A1 * | 12/2003 | Tucker | ................ | H04M 1/6505 379/88.01 |
| 2005/0144564 A1 * | 6/2005 | Shim | ................. | H04M 1/72552 715/764 |
| 2007/0094285 A1 * | 4/2007 | Agichtein | ......... | G06F 17/30398 |
| 2007/0299923 A1 * | 12/2007 | Skelly | .................. | G06Q 10/107 709/206 |
| 2008/0037744 A1 * | 2/2008 | Fux | ....................... | H04M 1/642 379/201.01 |
| 2009/0164914 A1 * | 6/2009 | Chen | .................... | G06Q 10/107 715/753 |
| 2010/0151889 A1 * | 6/2010 | Chen | ................. | G06F 17/30976 455/466 |
| 2010/0174974 A1 * | 7/2010 | Brisebois | .............. | G06F 17/243 715/223 |
| 2013/0007037 A1 * | 1/2013 | Azzam | ............. | G06F 17/30654 707/769 |
| 2013/0103391 A1 * | 4/2013 | Millmore | ................ | G06F 17/27 704/9 |
| 2013/0268260 A1 * | 10/2013 | Lundberg | ................ | G06F 17/28 704/8 |
| 2014/0358890 A1 * | 12/2014 | Chen | ................. | G06F 17/30654 707/710 |
| 2014/0379813 A1 * | 12/2014 | Charania | ................. | H04L 51/02 709/206 |
| 2015/0088888 A1 * | 3/2015 | Brennan | ........... | G06F 17/30598 707/737 |
| 2015/0135142 A1 * | 5/2015 | Flam | ...................... | G06F 3/0482 715/840 |
| 2015/0254691 A1 * | 9/2015 | Chandler | .............. | G06F 3/0482 705/7.32 |

FOREIGN PATENT DOCUMENTS

JP        2009003814 A   *   1/2009

OTHER PUBLICATIONS

"GO SMS Pro", GO Dev Team, Aug. 29, 2013, pp. 3, Android Apps on Google Play.
"OTTER", OTTER, LLC, 2010, p. 1, One Touch Text Response System, Home Page.

* cited by examiner

*Primary Examiner* — Doon Chow
*Assistant Examiner* — James T Tsai
(74) *Attorney, Agent, or Firm* — Kunzler Law Group, PC

(57) ABSTRACT

Apparatuses, systems, methods, and computer program products are disclosed for an automated messaging response. A message parsing module may parse a textual message to determine whether the message includes a question. A question determination module may determine a question type for the question. A response presentation module may present a response interface that includes a plurality of selectable responses to the question.

21 Claims, 12 Drawing Sheets

AUTOMATED MESSAGING RESPONSE

BACKGROUND

1. Field of the Invention

The present disclosure, in various embodiments, relates to text messaging and more particularly relates to automating responses for text messaging.

2. Description of the Related Art

Text messaging or chatting, in general, allows people to send brief, electronic messages using electronic devices, such as smart phones, tablet computers, etc. Text messages are usually sent from a sender device to a receiver device using a data network, such as a cellular network, a Wi-Fi network, a Bluetooth® network, etc.

It can be tedious, however, to type out a response to a question received by text message or chat, especially if the response requires excessive typing. Moreover, it can be dangerous to respond to a received message while doing other activities, such as driving, walking, biking, etc. Thus, it may be beneficial to provide an automated response interface where a user can quickly respond using a one-touch response.

SUMMARY

From the foregoing discussion, it should be apparent that a need exists for apparatuses, systems, methods, and computer program products for an automated messaging response. Beneficially, such apparatuses, systems, methods, and computer program products may allow a user to quickly provide a response to a received text or chat message without excessive typing to construct the response.

The present disclosure has been developed in response to the present state of the art, and in particular, in response to the problems and needs in the art that have not yet been fully solved by currently available messaging response systems. Accordingly, the present disclosure has been developed to provide apparatuses, systems, methods, and computer program products for an automated messaging response that overcome many or all of the above-discussed shortcomings in the art.

Apparatuses are presented for an automated messaging response. In one embodiment, a message parsing module is configured to parse a textual message to determine whether the message comprises a question. In another embodiment, a question determination module is configured to determine a question type for the question. A response presentation module, in a further embodiment, is configured to present a response interface that includes a plurality of selectable responses to the question. In some embodiments, the selectable responses are associated with the determined question type.

Methods are presented for an automated messaging response. In one embodiment, a method includes parsing a textual message to determine whether the message comprises a question. A method, in another embodiment, includes determining a question type for the question. In a further embodiment, a method includes presenting a response interface that includes a plurality of selectable responses to the question. In certain embodiments, the selectable responses are associated with the determined question type.

Computer program products are presented for an automated messaging response. In one embodiment, a computer program product includes an operation for parsing a textual message to determine whether the message comprises a question. A computer program product, in another embodiment, includes an operation for determining a question type for the question. In a further embodiment, a computer program product includes an operation for presenting a response interface that includes a plurality of selectable responses to the question. In certain embodiments, the selectable responses are associated with the determined question type.

A system for an automated messaging response is presented. In one embodiment, a server is configured to communicate data between information handling devices. A message parsing module, in a further embodiment, is configured to parse a textual message for an information handling device to determine whether the message comprises a question. In certain embodiments, a question determination module is configured to determine a question type for the question. A response presentation module, in one embodiment, is configured to present a response interface comprising a plurality of selectable responses to the question. The selectable responses may be associated with the determined question type.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. The disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
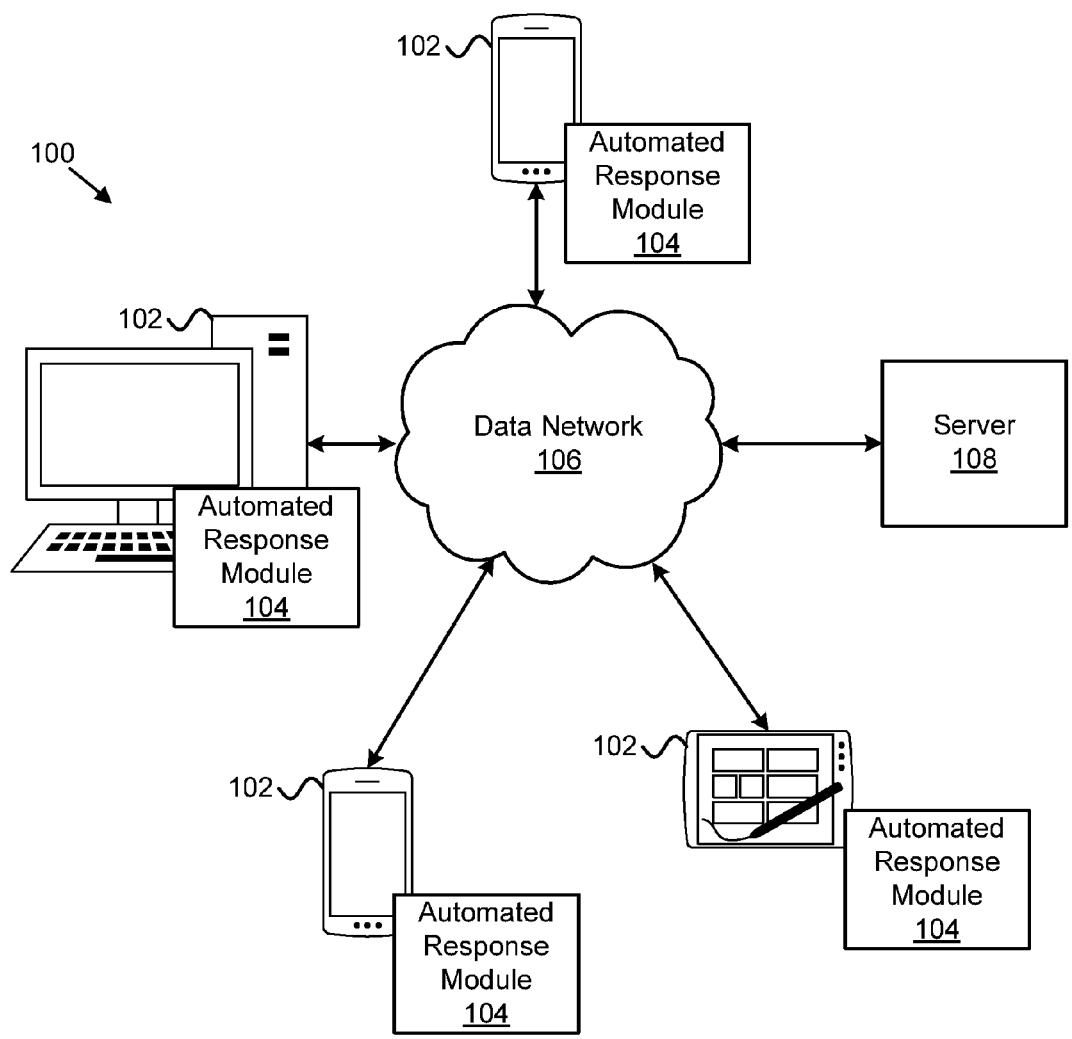
FIG. 1 is a block diagram illustrating one embodiment of a system for an automated messaging response.

As will be appreciated by one skilled in the art in light of this disclosure, aspects of the present invention may be embodied as an apparatus, a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++, C#, Objective-C, or the like, conventional procedural programming languages, such as the "C" programming language or the like, scripting programming languages such as JavaScript, PHP, Perl, Python, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 depicts one embodiment of a system 100 for an automated messaging response. In one embodiment, the system 100 includes a plurality of information handling devices 102, one or more automated response modules 104, a network 106, and a server 108, which are described in more detail below.

In one embodiment, the system 100 includes a plurality of information handling devices 102. In certain embodiments, an information handling device 102 may include an electronic device comprising a processor and memory, such as a desktop computer, a laptop computer, a smart phone, a tablet computer, a smart TV, an eBook reader, a smart watch, an optical head-mounted display, and/or the like. In one embodiment, two or more information handling devices 102 are communicatively connected using the data network 106. In another embodiment, information handling devices 102 that are communicatively connected send and/or receive text-based messages back and forth, such as short message service ("SMS") messages, instant messaging messages, chat messages, email messages, and/or the like. In a further embodiment, the information handling devices 102 execute an application to send and/or receive text-based messages, such as a text messaging program, an instant messaging program, a chat program, an email client, and/or the like, which may incorporate an automated response module 104. In certain embodiments, the information handling devices 102 include a touch-enabled display, a physical keyboard, a microphone, a digital camera, and/or the like, which allows a user to interact with the information handling device 102.

In one embodiment, the system 100 includes one or more automated response modules 104, which interpret a received text-based message and display an appropriate set of automated responses on an information handling device 102 based on the content of the text-based message. In another embodiment, at least a portion of the automated response module 104 is located on an information handling device 102 and/or the server 108. In certain embodiments, the automated response module 104 includes a plurality of modules to perform the operations of parsing a textual message to determine whether the message includes a question, determining a question type for the question, and presenting a response interface that includes a plurality of selectable responses associated with the question type. The automated response module 104, and its associated modules, are described in more detail below with reference to FIGS. 2 and 3.

In certain embodiments, the system 100 includes a data network 106. The data network 106, in one embodiment, is a digital communication network 106 that transmits digital communications related to an automated messaging response system 100. The digital communication network 106 may include a wireless network, such as a wireless cellular network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, and/or the like. In certain embodiments, the server 108 includes at least a portion of the automated response module 104. In another embodiment, the information handling device 102 is communicatively coupled to the server 108 through the data network 106. In certain embodiments, the information handling device 102 offloads at least a portion of the information processing associated with the automated response module 104, such as natural language processing, text message parsing, and/or the like, to the server 108.

Figure 2:
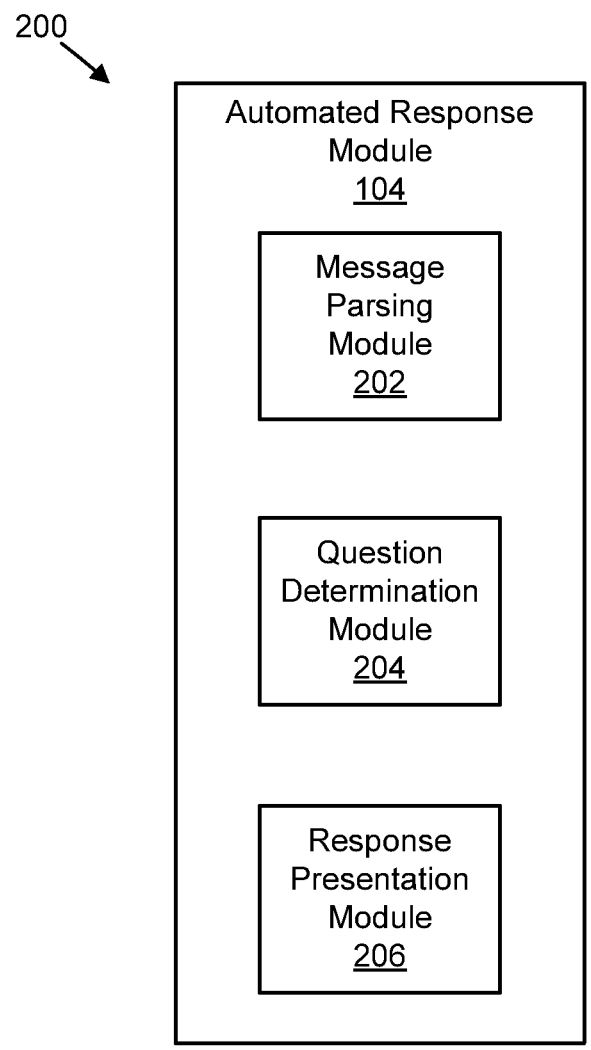
FIG. 2 is a schematic block diagram illustrating one embodiment of a module for an automated messaging response.

FIG. 2 depicts one embodiment of a module 200 for an automated messaging response. In one embodiment, the module 200 includes an automated response module 104. In the depicted embodiment, the automated response module 104 includes a message parsing module 202, a question determination module 204, and a response presentation module 206, which are described in detail below.

In one embodiment, the automated response module 104 includes a message parsing module 202 configured to parse a textual message to determine whether the message comprises a question. In one embodiment, the message parsing module 202 determines one or more sentence boundaries for the message. For example, the message may contain more than one sentence and the message parsing module 202 determines the boundaries of the sentences by recognizing sentence identifiers such as punctuation (e.g., periods, question marks, exclamation points, and/or the like), capital letters, and/or the like.

The message parsing module 202, in certain embodiments, performs natural language processing on the message to determine whether the message includes a question. In one embodiment, the message parsing module 202 identifies keywords and/or other textual elements that are characteristic of a question in order to determine the message contains a question. For example, the message parsing module 202 may search the message for a question mark at the end of a sentence, indicating the sentence is a question. In a further example, the message parsing module 202 may identify various keywords at the beginning of a sentence to determine the sentence is a question, such as "Where," "When," "Do," "How," "Why," and/or the like. In one embodiment, by identifying keywords and/or phrases that indicate a question, the message parsing module 202 is able to determine a sentence is a question in situations where the sentence does not end in a question mark or any other question identifying punctuation.

In one embodiment, the message parsing module 202 is able to recognize and handle slang terms and abbreviations in a message. For example, if the received message states, "Will u pick up some milk 2 night?", the message parsing module 202 may recognize "u" to be "you" and "2 night" to be "tonight." In some embodiments, the message parsing module 202 maintains a list of abbreviations mapped to the full word/phrase. In certain embodiments, the message parsing module 202 is able to correct for typos in a message. For example, it is often the case that text messages, instant messages, emails, and the like, contain typos and other mistakes (e.g., missing a question mark at the end of the sentence, spelling mistakes, and/or the like). The message parsing module 202, in these situations, may recognize the typos and/or determine a sentence is a question from the context and/or structure of the sentence. The message parsing module 202, in certain embodiments, maintains a list of possible question identifiers, keywords, synonyms, and/or phrases, including common typos (e.g., common misspellings, abbreviations, and/or the like) and references the list during processing of the message.

In some embodiments, the message parsing module 202 utilizes a decision tree and/or a branching algorithm where a group of synonyms associated with each identifier word is searched and compared against the received message. For example, with a poorly formatted question that begins with "Doo u . . . ?", the message parsing module 202 may search a group of words associated with each word, e.g., "Doo" and "u", in order to determine that the correct phrasing should be "Do you" and that the message includes a question. Thus, "Doo" could be a common misspelling of "Do", and would be part of the synonym group associated with "Do." Similarly, "u" may be a common abbreviation for "you" and would part of the synonym group associated with "you." In this manner, the message parsing module 202 may handle a variety of spellings, abbreviations, slang terms, and/or the like.

In some embodiments, the message parsing module 202 is located on the server 108, which may include more resources than the information handling device 102 of the message receiver. In a further embodiment, the server 108 performs message parsing processing related to the message parsing module 202, including natural language processing, and/or the like. The results of the servers 108 processing may be sent to the receiver information handling device 102 through the data network 106. In this manner, computationally intensive processing may be performed on the server 108 instead of the information handling device 102 of the message receiver.

The automated response module 104, in a further embodiment, includes a question determination module 204 configured to determine a question type for the question identified in the message by the message parsing module 202. The question type, in certain embodiments, includes, but is not limited to, yes/no questions, date/time questions, location questions, contact questions, quantity questions, and/or the like. In one embodiment, a yes/no question is a question that can be answered with a "yes" or "no" response. For example, "Do you want to go to dinner tonight?" is a question that may be answered with a "yes" or a "no" response. In another embodiment, a date/time question is a question that can be answered with a date and/or time response. For example, "What time does the party start?" or "When is the board meeting?" are questions that may be answered with a time and/or date response.

In one embodiment, a location question is a question that can be answered with a location response, such as an address, global positioning system ("GPS") coordinates (e.g., a latitude, a longitude, and/or another geographic coordinate), and/or the like. For example, "Where is the meeting?" is a question that may be answered with a location response. In a further embodiment, a contact question is a question that can be answered with information from a contact associated with the sender and/or receiver of the message. The contact information, in certain embodiments, is associated with the information handling device 102 of the message receiver. For example, "What is John's phone number?" is a contact question that may be answered by accessing the message receiver's contact information for John stored on the receiver's smart phone, accessing the receiver's social network information associated with John (e.g., John's Facebook® information, or the like), and/or the like. In one embodiment, a quantity question is a question that can be answered with a numerical response, such as an integer, a real number, and/or the like. For example, "How many boxes do you need?" is a quantity question that may be answered with a number.

In certain embodiments, the question determination module 204 identifies one or more predefined terms, a predefined sequence of terms, or the like associated with the question type. In certain embodiments, the predefined terms include keywords and/or phrases that indicate the question type. For example, the predefined terms associated with a yes/no question may include "Do," "Can," "Will," "Does," "Want to," and/or the like. Similarly, the predefined terms associated with a date/time question may include "When," "What time," "What day," and/or the like. The predefined terms associated with a location question may include "Where," "Where is," "Where does," "What is the address," and/or the like. For a contact question, the predefined terms may include "Who," "phone number," "address," "email," a contact name, and/or the like. The predefined terms associated with a quantity question may include "How many," "How much," and/or the like. In certain embodiments, the question determination module 204 may identify a sequence of predefined terms, a predefined sequence of terms, or the like associated with a question type, while the same terms in a different sequence may not be associated with the question type. For example, the predefined sequence of terms "where is" may be associated with a location question while "is where" may not be associated with a question at all. A term, as used herein, may include a single word, multiple words, a phrase, or the like.

In certain embodiments, similar to the message parsing module 202 described above, the question determination module 204 recognizes slang terms, typos, and/or abbreviations within a question. For example, the question determination module 204 may recognize a question such as "Wanna go to the mall today?" as a yes/no question, even though the question contains the slang "wanna" instead of "want to." In certain embodiments, the question determination module 204 recognizes abbreviations, slang terms, words, typos, phrases, and/or the like, in one or more different languages. While the example questions described herein are given in the English language, as representative examples, in other embodiments, the automated response module 104 may be configured to operate in and/or provide automated messaging responses in a different language, in multiple languages, or the like.

In some embodiments, the question determination module 204 determines the question type for the question based on a token, keyword, identifier, and/or the like associated with the text message. For example, the message sender may assign a "yes/no" token to a yes/no question, which may be recognized by the question determination module 204 associated with the message receiver. Alternatively, the server 108 may assign the question type token, keyword, identifier, and/or the like, if the message is processed in the server 108 before being forwarded to the message receiver. In this manner, natural language processing, which may be computationally intensive, is performed on a device (the server 108) that may have more resources than the information handling device 102 of the message receiver.

In another embodiment, the automated response module 104 includes a response presentation module 206 configured to present a response interface comprising a plurality of selectable responses to a question. For example, the response presentation module 206 may present an interface that includes one or more interactive buttons, a number chooser, a drop down menu, a contact list, a single contact, a map, and/or the like. In one embodiment, the response presentation module 206 presents selectable responses that are associated with the determined question type. In certain embodiments, the plurality of selectable responses includes one or more user-defined or user-configured responses for a particular question type.

In some embodiments, for example, the response presentation module 206 presents an interface that includes a "yes" response and a "no" response associated with a yes/no question. In another example, the response presentation module 206 may present an interface that includes a date response and/or a time response associated with a date/time question. Further, the response presentation module 206 may present an interface that includes a list of addresses, a location on a map, and/or the like, associated with a location question. The response presentation module 206, in another example, may present an interface that includes a numerical response, such as a number chooser or the like associated with a quantity question. In a further example, the response presentation module 206 may present an interface that includes a list of one or more contacts, information associated with a single contact, and/or the like, associated with a contact question.

In some embodiments, the response presentation module 206 configures the response interface based on one or more words and/or phrases in the message. For example, in response to receiving a date/time question such as "When is the next meeting in May?", the response presentation module 206 may display an interactive calendar for May instead of displaying a calendar of the entire year, a date chooser, and/or the like. In this manner, the response presentation module 206 is able to provide greater granularity to the plurality of selectable responses, which allows a user to quickly reply without spending a lot of time interacting with their information handling device 102.

In certain embodiments, a user interacts with one or more of the selectable responses presented by the response presentation module 206 by using a one-touch or one-click response, which provides a user an easy and quick way to respond to a text message without requiring excessive typing or interaction with their information handling device 102. In this manner, the automated messaging system 100 may provide more safety benefits for a user while driving, walking, and/or the like, because the user can quickly respond to a text message with a single action, such as a single touch on a touch screen or a single button press, which does not require the user to type out a response. Alternatively, the response presentation module 206 may present the question and the plurality of selectable responses audibly to the user. The user may then respond by speaking one of the selectable responses and/or by audibly relaying a custom message. For example, the user may simply respond by saying "Yes" or "No" in response to a yes/no question.

Figure 3:
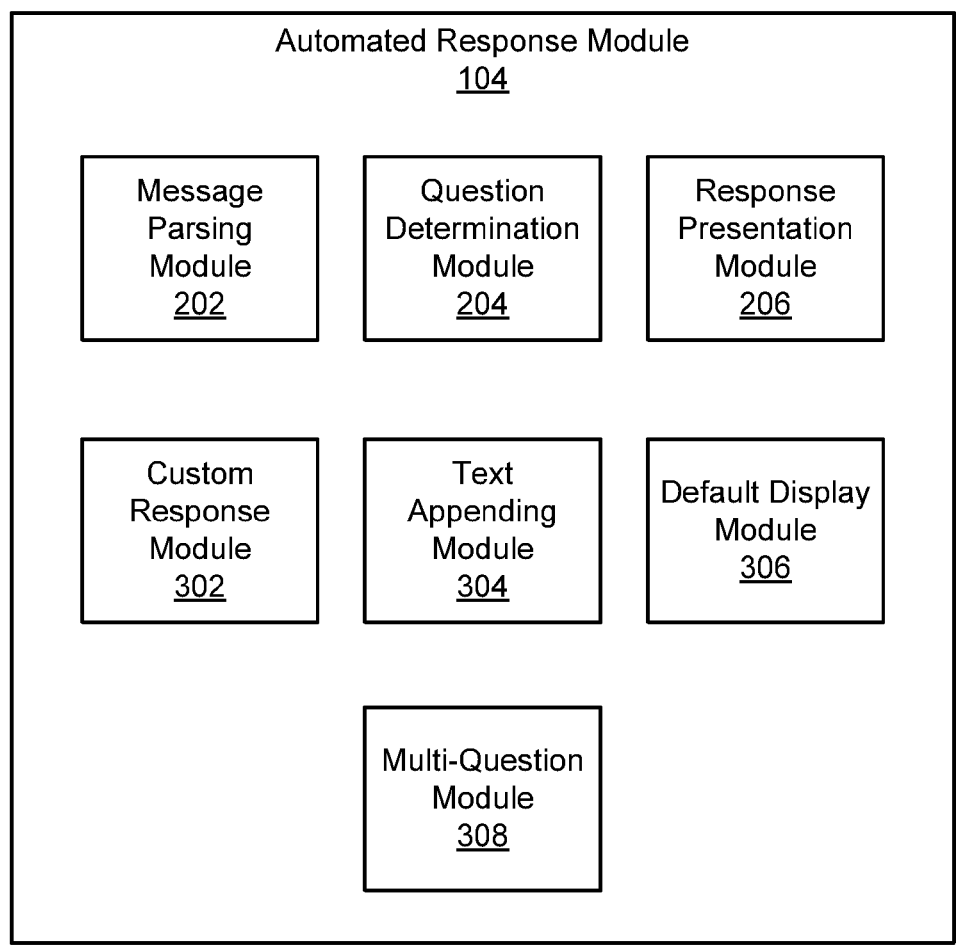
FIG. 3 is a schematic block diagram illustrating one embodiment of another module for an automated messaging response.

FIG. 3 depicts one embodiment of another module 300 for an automated messaging response. In one embodiment, the module 300 includes an automated response module 104. In another embodiment, the automated response module 300 includes a message parsing module 202, a question determination module 204, and a response presentation module 206, which are substantially similar to the message parsing module 202, the question determination module 204, and the response presentation module 206 described with reference to FIG. 2. In some embodiments, the automated response module 104 includes a custom response module 302, a text appending module 304, a default display module 306, and a multi-question module 308, which are described in more detail below.

In one embodiment, the automated response module 104 includes a custom response module 302 configured to present a custom-response interface for entering a custom response instead of one of the plurality of selectable responses. For example, the user may bypass the plurality of selectable responses presented by the response presentation module 206 and enter a custom response, e.g., by typing a custom message. The custom response module 302, in certain embodiments, presents the default input interface for the information handling device 102, such as a virtual keyboard, which allows the user to enter a custom message to respond to the text message. In another embodiment, the custom response module 302 displays the custom response interface as an element of the response interface presented by the response presentation module 206. For example, the response interface may include an interactive tab for the selectable response interface and an interactive tab for the custom response interface. The user may use the interactive tabs to switch between the response interface with the selectable responses and the custom response interface.

In another embodiment, the automated response module 104 includes a text appending module 304 configured to append user-entered text to a selected response in response to user input. For example, in response to the question "Do you have any money?" the user may select a "yes" response presented by the response presentation module 206 and then append a custom message to the selected response, such as "I have $20.00." Thus, in certain embodiments, the text appending module 304 presents the default input interface for the information handling device 102 or a custom-response interface presented by the custom response module 302, in response to the user selecting a selectable response to the question presented by the response presentation module 206. Alternatively, as described above, the text appending module 304 displays the default input interface as an element of the response interface presented by the response presentation module 206. The user may choose to bypass appending a custom message and just send the selected response to the question.

The automated response module 104, in a further embodiment, includes a default display module 306 configured to display a default response interface in response to determining the message does not include a question. If the message does not include a question, the response presentation module 206, in one embodiment, does not present the response interface with a plurality of selectable responses, but instead the default display module 306 displays the default display for the information handling device 102. In certain embodiments, the default display includes a virtual keyboard or the like. In some embodiments, the message may include a question that is not recognizable by the automated response module 104, e.g., the question could not be parsed out of the message by the message parsing module 202. In such an embodiment, the default display module 306 would present the default display such that the user could respond to the message using the default display.

In one embodiment, the automated response module 104 includes a multi-question module 308 configured to present one or more additional selectable responses associated with one or more additional questions identified within the parsed message. For example, a message may contain two or more questions, such as "What time are you leaving? Will you pick up milk on the way home?" In this example, the multi-question module 308 may present a response interface that includes a plurality of selectable responses associated with the first questions, such as a data/time chooser, and a plurality of selectable responses associated with the second question, such as yes/no buttons. The different responses may be presented within the same interface or as different elements of a tabbed interface, such that the selectable responses associated with the first question may be presented when the first tab is selected and the selectable responses associated with the second question may be presented when the second tab is selected.

In certain embodiments, the multi-question module 308 labels each response to each question in response to the user selecting a response. For the previous example, the response may be formatted such as "Q1: 6:30 p.m. Q2: Yes." In another embodiment, the multi-question module 308 concatenates the selected responses together. For example, the response to the previous example may be "6:30 p.m.; Yes.", or the like. Alternatively, as described above, the user may bypass the selectable responses and enter a custom message or the user may append a custom message to each selected response associated with each question of the multi-question message.

Figure 4:
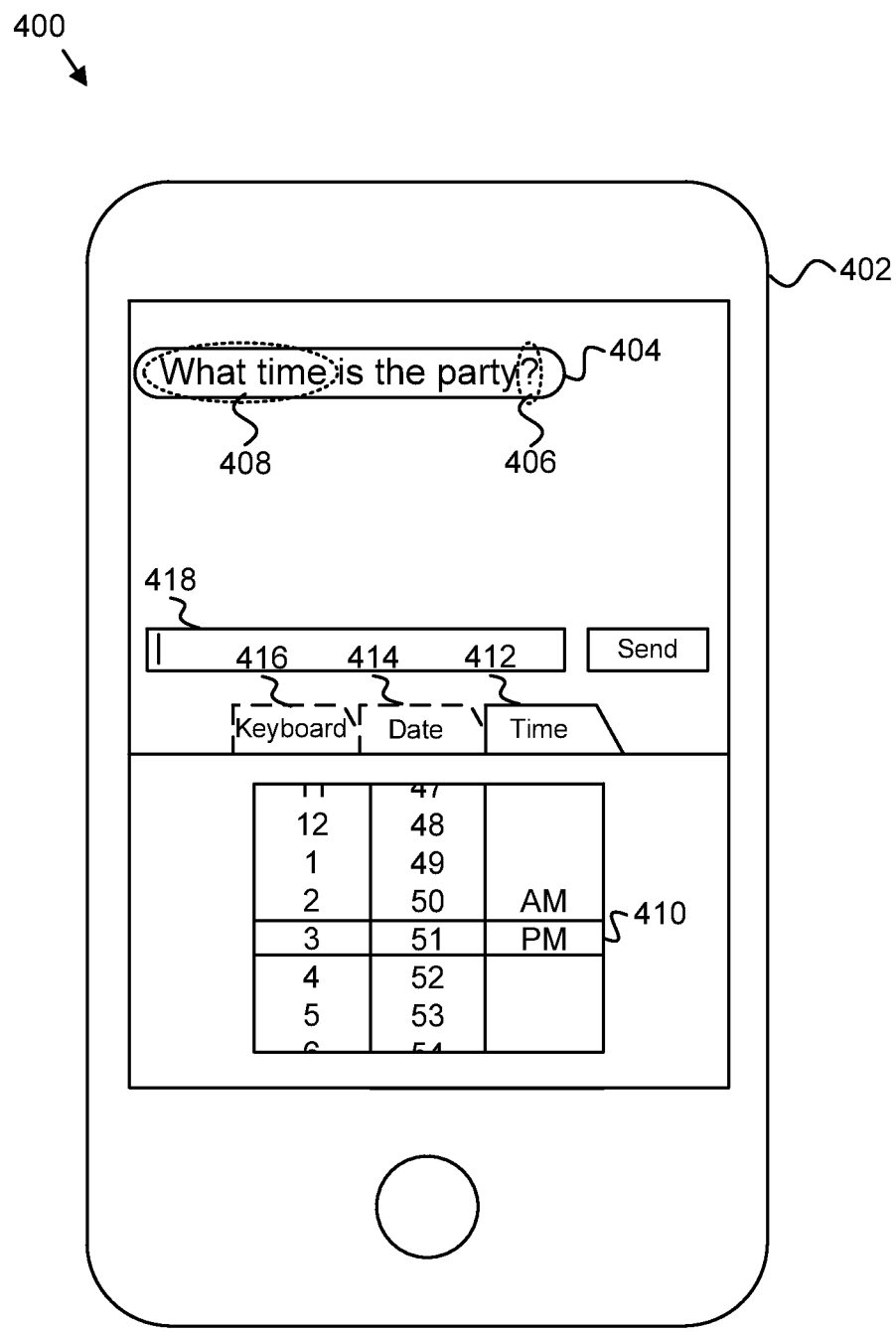
FIG. 4 illustrates one embodiment of an automated messaging response system associated with a date/time question.

FIG. 4 depicts one embodiment of an automated messaging response system 400. In one embodiment, a text message 404 is received and displayed on an information handling device 402, e.g., a smart phone. The message parsing module 202, in another embodiment, parses the received text message 404 to determine whether the message includes a question. In a further embodiment, the message parsing module 202 determines sentence boundaries of the text message 404. In the depicted embodiment 400, there is only one sentence in the received text message 404; however, the text message 404 may include a plurality of sentences and the message parsing module 202, in one embodiment, would determine the sentence boundaries for each sentence such that each sentence could be processed and responded to independently. The message parsing module 202, in certain embodiments, searches for question-identifying symbols and/or keywords within the text message 404 to determine whether the text message includes a question, such as the phrase "What time" 408 and/or a question mark 406 at the end of the sentence.

In response to determining the text message includes a question, the question determination module 204 determines a question type for the question. In certain embodiments, the question determination module 204 uses keywords and/or phrases to determine the question type for the question. In the depicted embodiment 400, the question determination module 204 may determine that the question is a date/time question by identifying the phrase "What time" at the beginning of the question.

In response to determining the question type for the question, the response presentation module 206 presents a response interface that includes a plurality of selectable responses associated with the determined question type. Thus, in the depicted embodiment 400, the response presentation module 206 presents a time selector 410 on the time tab 412 that the user may use to select a time to response with. Alternatively, or in addition to the selected time, the user may select a date from the "Date" tab 414, which may present a similar date chooser (e.g. a calendar), or a custom message from the "Keyboard" tab 416, which may present a virtual keyboard. The custom message may be sent without a selected time and/or date or the custom message may be appended to the selected time and/or date. In another embodiment, the response presentation module 206 sends the selected time or date automatically in response to the user's selection. In some embodiments, the response presentation module 206 populates a response field 418 with the selected time and/or date and the response is not sent until the user manually sends the message.

Figure 5:
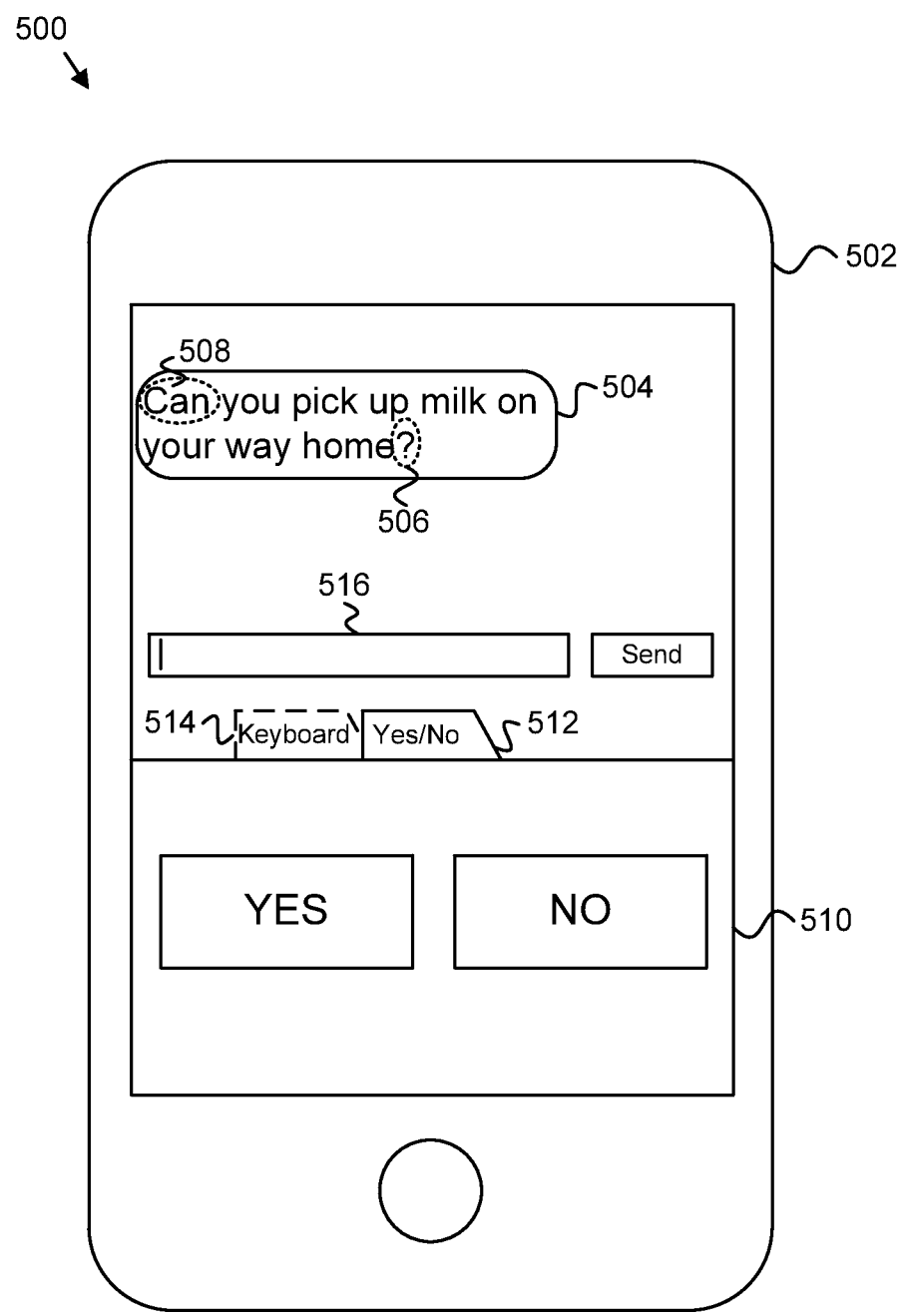
FIG. 5 illustrates another embodiment of an automated messaging response system associated with a yes/no question.

FIG. 5 depicts another embodiment of an automated messaging response system 500. In the depicted embodiment 500, similar to FIG. 4, a text message 504 is received and displayed on an information handling device 502, e.g., a smart phone. The message parsing module 202, in one embodiment, determines the message 504 includes a question by identifying the keyword "Can" 508 at the beginning of the sentence and the question mark 506 at the end of the sentence. The question determination module 204, in response to the message parsing module 202 determining the message includes a question, determines a question type for the question. In the depicted embodiment 500, the question determination module 204 determines the question type is a yes/no question by identifying the keyword "Can" 508.

In one embodiment, in response to the question determination module 204 determining the question type, the response presentation module 206 presents a response interface that includes a plurality of selectable responses associated with the question type. In the depicted embodiment 500, the response presentation module 206 presents a pair of yes/no buttons 510 on the "Yes/No" tab 512. The user may quickly respond to the received message 504 by pressing one of the yes/no responses 510. Alternatively, the user may enter a custom response on the "Keyboard" tab 514, which may be sent without a selected response or may be appended to the selected response. In one embodiment, the response presentation module 206 sends the selected yes/no response automatically. In another embodiment, the response presentation module 206 populates a response field 516 and the response is not sent until the user manually sends the message.

Figure 6:
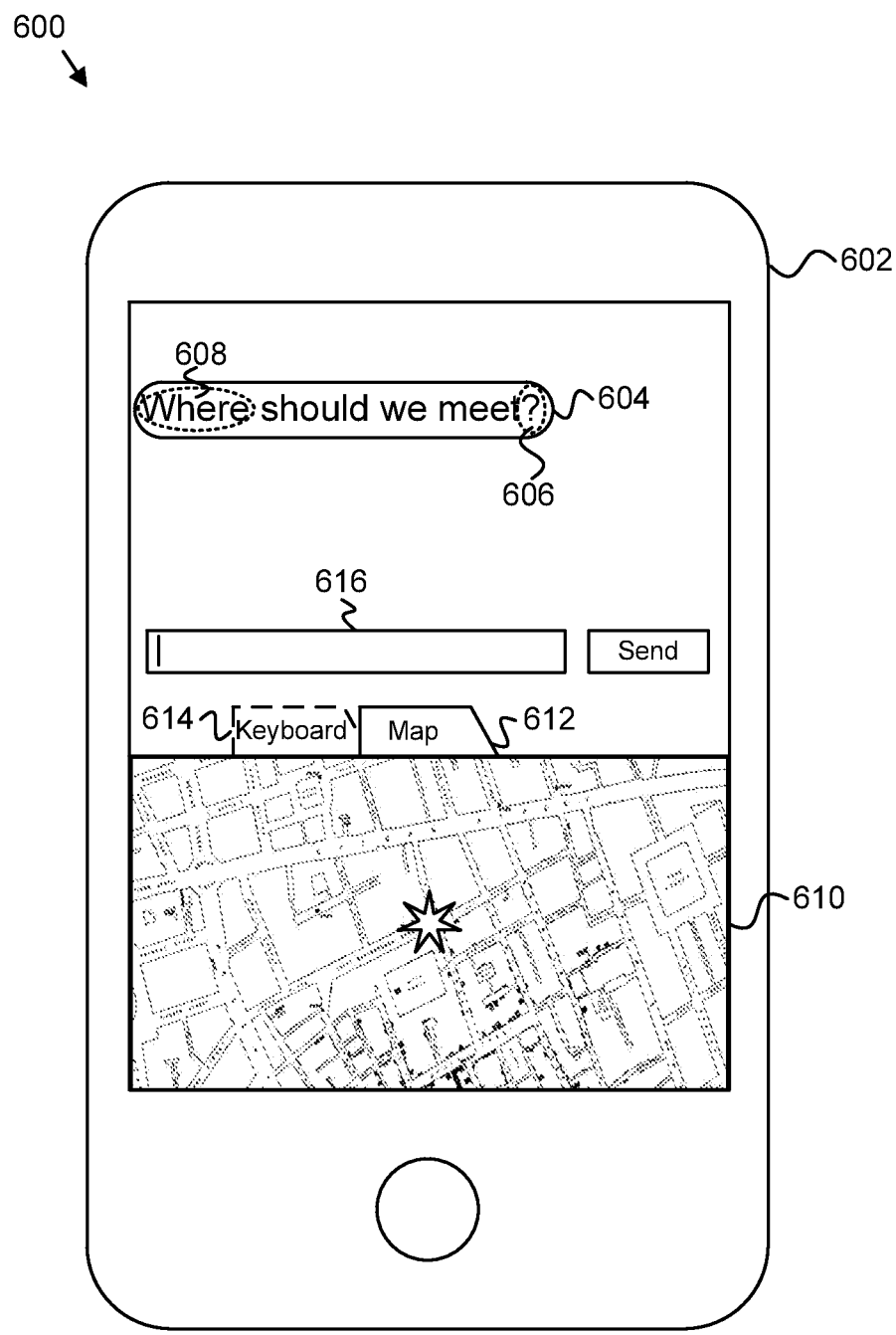
FIG. 6 illustrates a further embodiment of an automated messaging response system associated with a location question.

FIG. 6 depicts a further embodiment of an automated messaging response system 600. In the depicted embodiment 600, a text message 604 is received and displayed on an information handling device 602, e.g., a smart phone. The message parsing module 202, in one embodiment, determines the message 604 includes a question by identifying the keyword "Where" 608 at the beginning of the sentence and the question mark 606 at the end of the sentence. The question determination module 204, in response to the message parsing module 202 determining the message includes a question, determines a question type for the question. In the depicted embodiment 600, the question determination module 204 determines the question type is a location question by identifying the keyword "Where" 608.

In one embodiment, in response to the question determination module 204 determining the question type, the response presentation module 206 presents a response interface that includes a plurality of selectable responses associated with the question type. In the depicted embodiment 600, the response presentation module 206 presents an interactive map 610 on the "Map" tab 612. The user may quickly respond to the received message 604 by selecting a location on the map 610. Alternatively, the user may enter a custom response on the "Keyboard" tab 614, which may be sent without a selected response or may be appended to the selected response. In one embodiment, the response presentation module 206 sends the selected map location response automatically. In another embodiment, the response presentation module 206 populates a response field 616 with an address, GPS coordinates (e.g., a latitude, a longitude, and/or another geographic coordinate), and/or the like, and the response is not sent until the user manually sends the message. Regardless of a format in which a user may select a location (e.g., a position on a map, an address from a contact book, or the like), in certain embodiments, the response presentation module 206 may determine a machine-understandable version of the selected location to be sent with the response, such as a latitude and longitude or other geographic coordinates, which may be interpreted by a receiving information handling device 102 and displayed on a map or otherwise processed.

Figure 7:
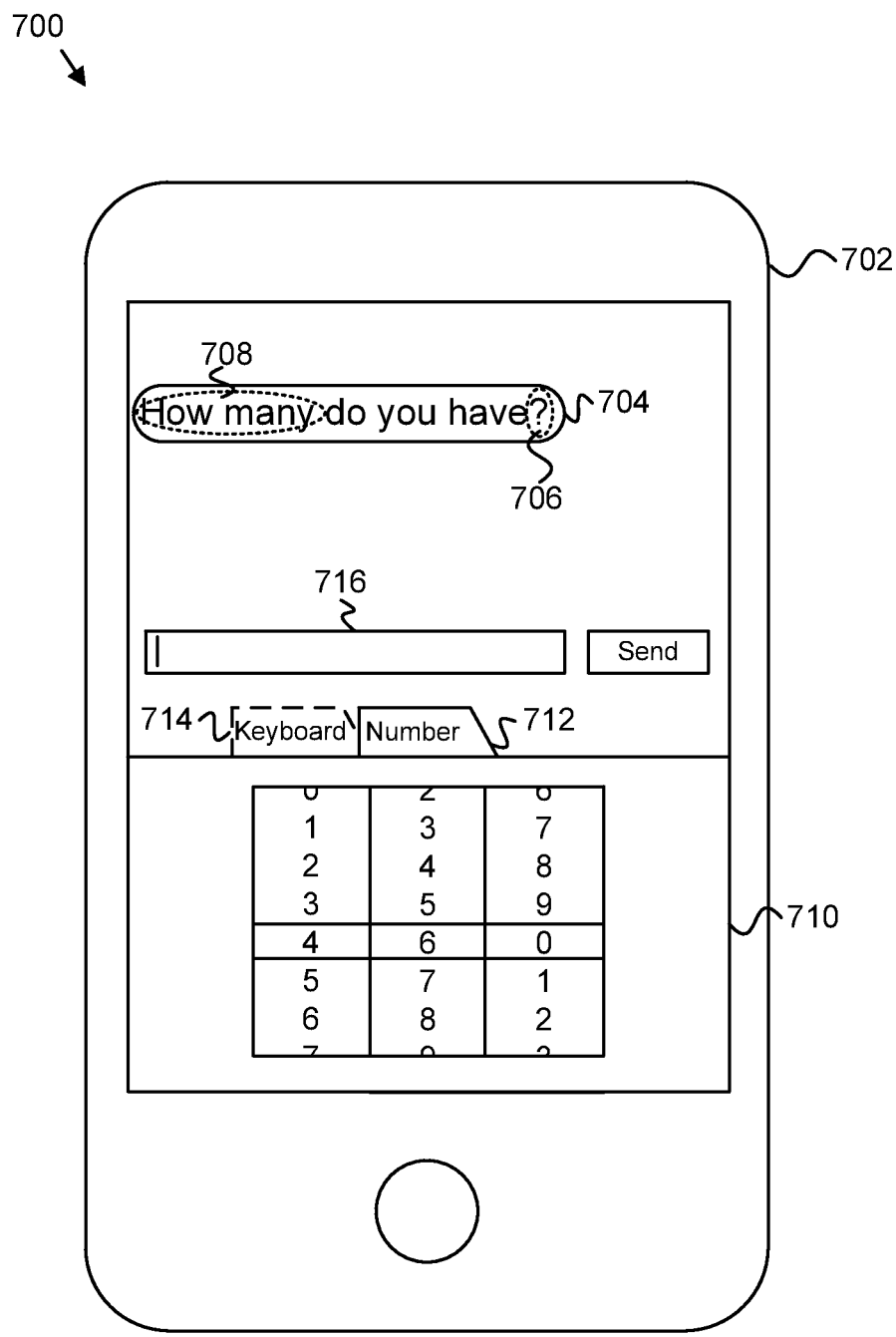
FIG. 7 illustrates one embodiment of an automated messaging response system associated with a quantity question.

FIG. 7 depicts one embodiment of an automated messaging response system 700. In the depicted embodiment 700, a text message 704 is received and displayed on an information handling device 702, e.g., a smart phone. The message parsing module 202, in one embodiment, determines the message 704 includes a question by identifying the phrase "How many" 708 at the beginning of the sentence and the question mark 706 at the end of the sentence. The question determination module 204, in response to the message parsing module 202 determining the message includes a question, determines a question type for the question. In the depicted embodiment 700, the question determination module 204 determines the question type is a quantity question by identifying the phrase "How many" 708.

In one embodiment, in response to the question determination module 204 determining the question type, the response presentation module 206 presents a response interface that includes a plurality of selectable responses associated with the question type. In the depicted embodiment 700, the response presentation module 206 presents a number chooser 710 on the "Number" tab 712. The user may quickly respond to the received message 704 by selecting a number from the number chooser 710. Alternatively, the user may enter a custom response on the "Keyboard" tab 714, which may be sent without a selected response or may be appended to the selected response. In one embodiment, the response presentation module 206 sends the selected number response automatically. In another embodiment, the response presentation module 206 populates a response field 716 with the selected number and the response is not sent until the user manually sends the message.

Figure 8:
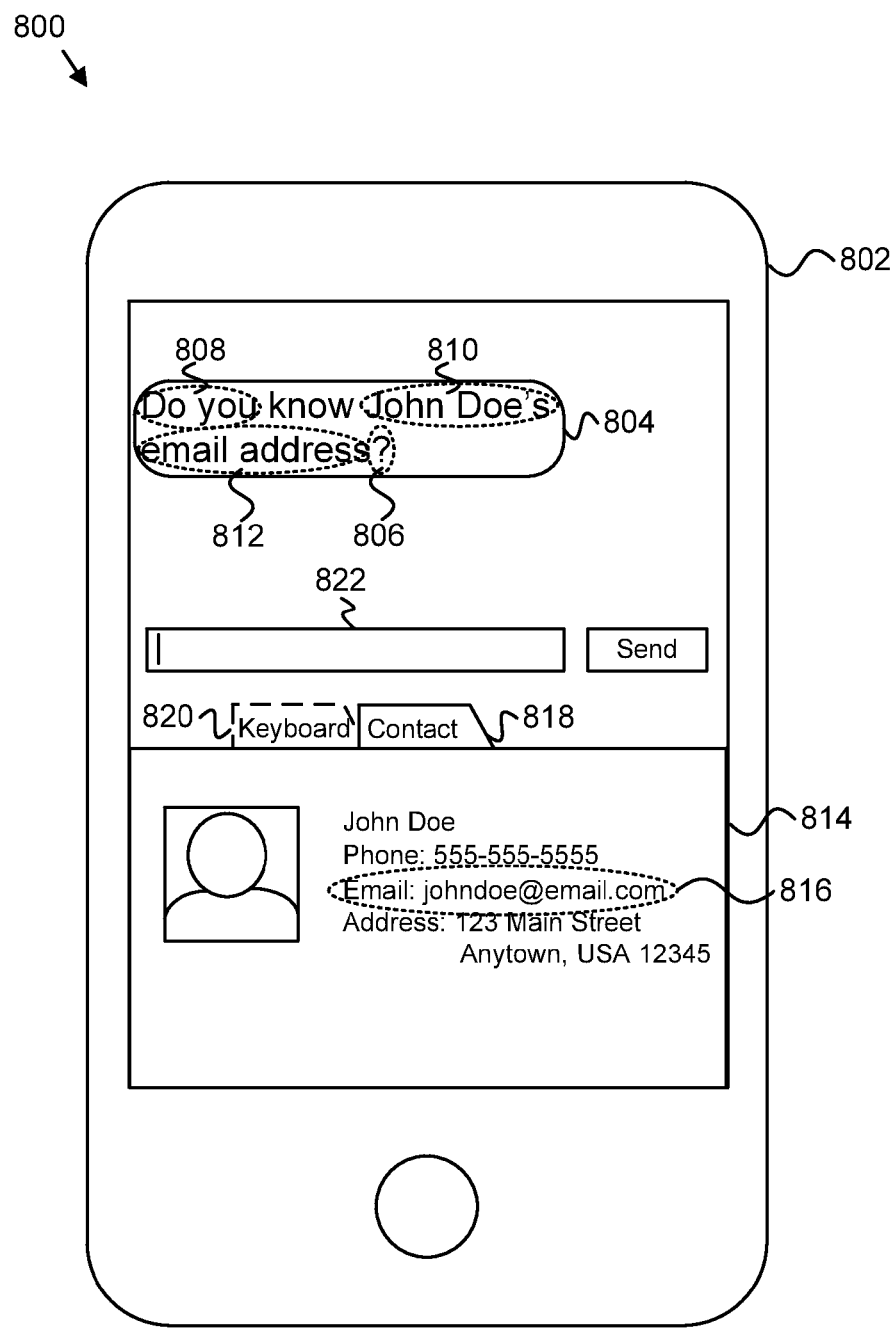
FIG. 8 illustrates another embodiment of an automated messaging response system associated with a contact question.

FIG. 8 depicts another embodiment of an automated messaging response system 800. In the depicted embodiment 800, a text message 804 is received and displayed on an information handling device 802, e.g., a smart phone. The message parsing module 202, in one embodiment, determines the message 804 includes a question by identifying the phrase "Do you" 808 at the beginning of the sentence and the question mark 806 at the end of the sentence. The question determination module 204, in response to the message parsing module 202 determining the message includes a question, determines a question type for the question. In the depicted embodiment 800, for example, the question determination module 204 may determine the question type is a contact question by identifying the phrase "Do you" 808, the name "John Doe" 810, and the phrase "email address" 812.

In one embodiment, in response to the question determination module 204 determining the question type, the response presentation module 206 presents a response interface that includes a plurality of selectable responses associated with the question type. In the depicted embodiment 800, the response presentation module 206 presents a contact interface 814 associated with John Doe on the "Contact" tab 818. The user may quickly respond to the received message 804 by selecting one or more contact details from the contact interface, such as the email address 816. The user may also respond with a contact object containing all of the contact's information. Moreover, the contact interface 814 may present a list of possible contacts associated with the text message 804, which the user may sort through to find the desired contact, e.g., John Doe. The user may, alternatively, enter a custom response on the "Keyboard" tab 820, which may be sent without a selected response or may be appended to the selected response. In one embodiment, the response presentation module 206 sends the selected contact response automatically. In another embodiment, the response presentation module 206 populates a response field 822 with the selected contact information and the response is not sent until the user manually sends the message.

Figure 9:
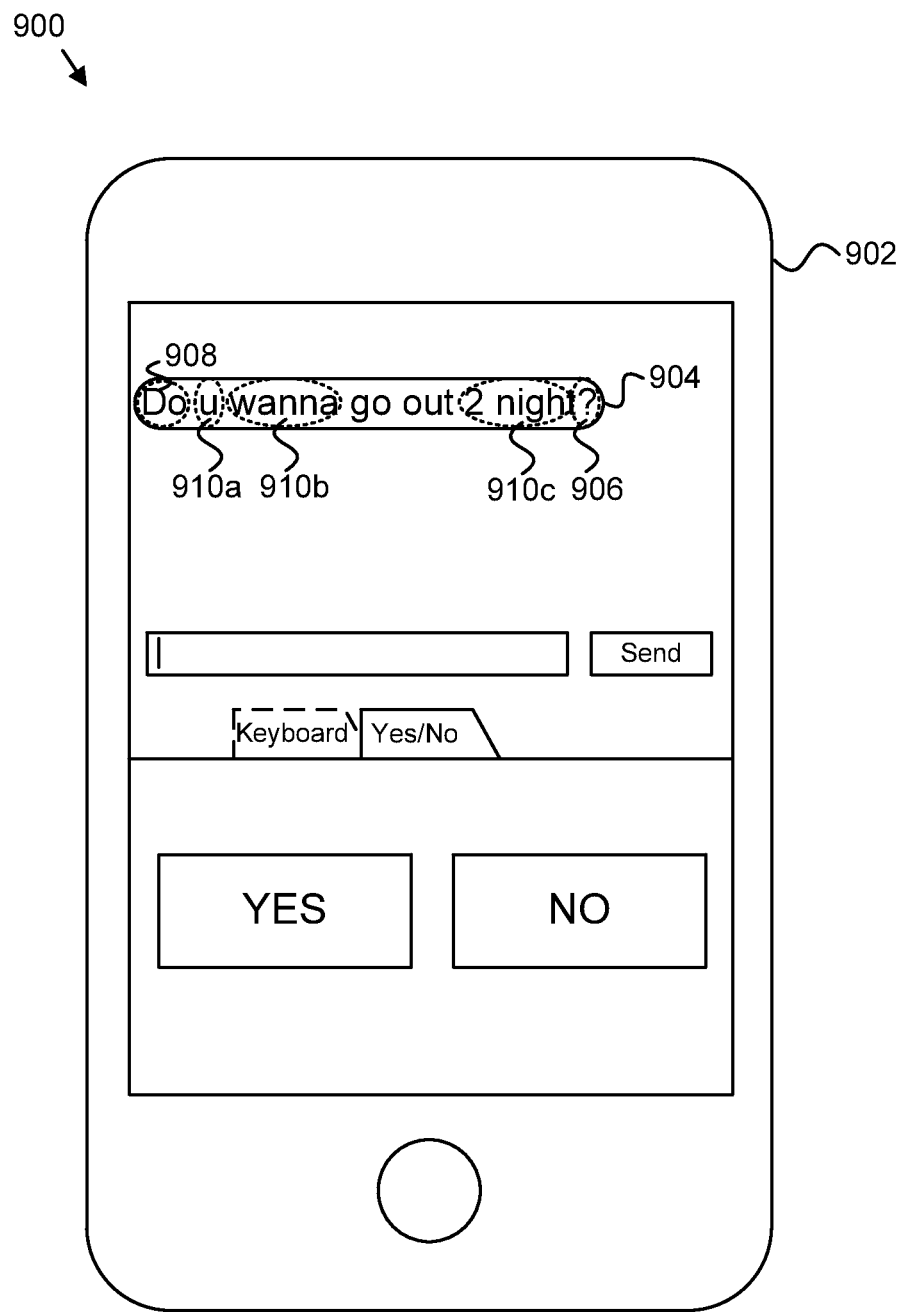
FIG. 9 illustrates an embodiment of an automated messaging response system where the message includes abbreviations and/or slang terms.

FIG. 9 depicts a further embodiment of an automated messaging response system 900. In the depicted embodiment 900, a text message 904 is received and displayed on an information handling device 902, e.g., a smart phone. The message parsing module 202, in one embodiment, determines the message 904 includes a question by identifying the phrase "Do" 908 and the abbreviation/slang term "u" 910*a* at the beginning of the sentence and also the question mark 906 at the end of the sentence. The message parsing module 202, in certain embodiments, recognizes the abbreviation/slang term "u" 910*a* and interprets the term to be "you," which helps the message parsing module 202 determine the message is a question.

The question determination module 204, in response to the message parsing module 202 determining the message includes a question, determines a question type for the question. In the depicted embodiment 900, for example, the question determination module 204 may determine the question type is a yes/no question by identifying the phrase "Do" 908 and the abbreviation/slang term "u" 910*a*. Like the message parsing module 202, in certain embodiments, the question determination module 204 recognizes the abbreviation/slang term "u" 910*a* and interprets the term to be "you" in order to help determine the question type for the question, e.g., the phrase "Do you" identifies this as a yes/no question. In another embodiment, the message parsing module 202 and/or the question determination module 204 recognize other abbreviations/slang terms in the message 904, such as "wanna" 910*b* and "2 night" 910*c*, in order to determine the context of the message and to help identify whether the message is a question and/or a question type for the question.

Figure 10:
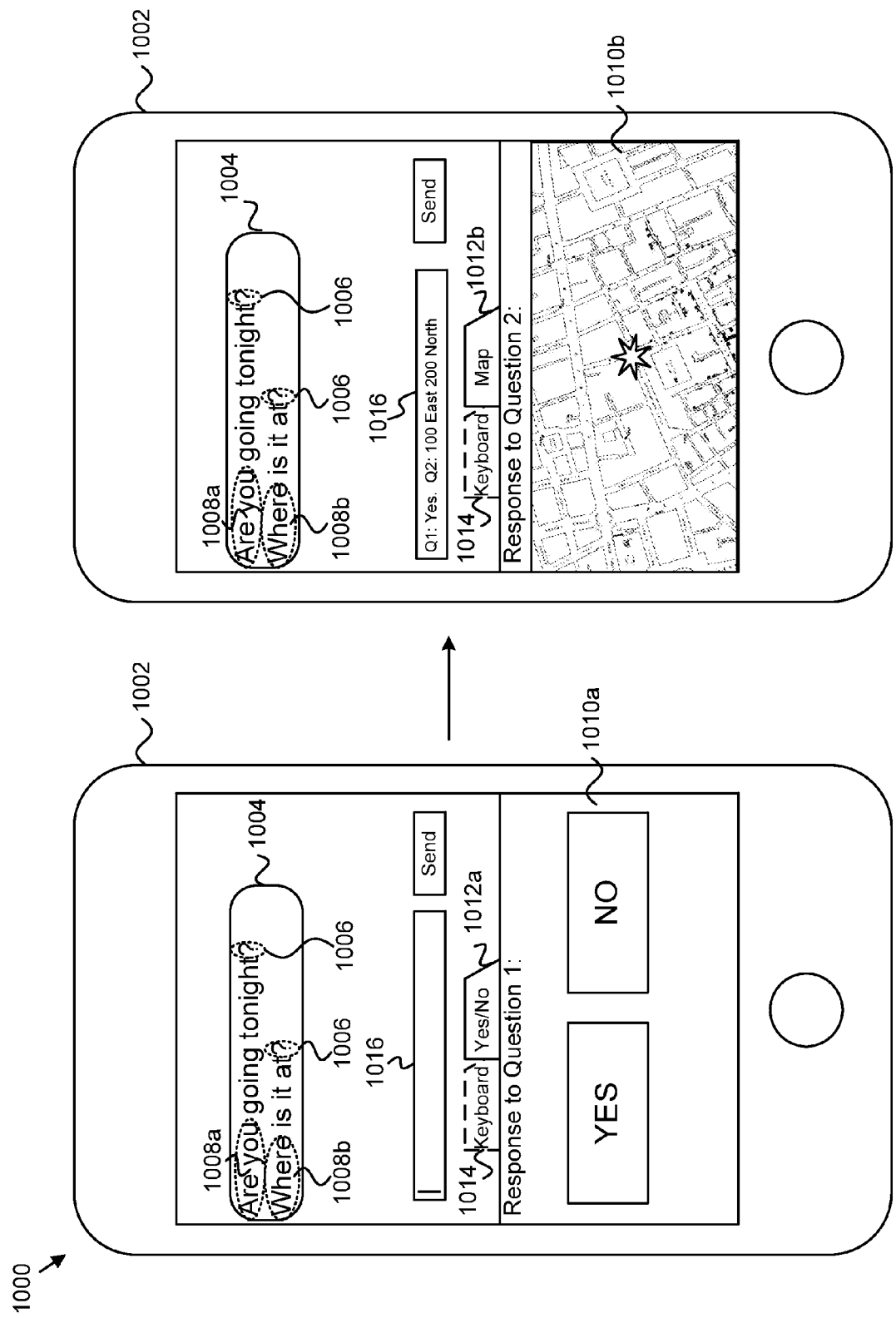
FIG. 10 illustrates one embodiment of an automated messaging response system where the message includes multiple questions.

FIG. 10 depicts one embodiment of an automated messaging response system 1000. In the depicted embodiment 1000, a text message 1004 is received and displayed on an information handling device 1002. As depicted, the text message 1004 includes two questions; however, the text message 1004 may include any number of questions. The message parsing module 202, in one embodiment, determines one or more sentence boundaries within the message 1004 using keywords and/or sentence punctuation. For example, the message parsing module 202 may determine the message 1004 contains two questions because the message contains two question marks 1006, signifying that there are two questions within the message.

For each question, in one embodiment, the question determination module 204 determines a question type for the questions using keywords and/or phrases within the questions. The question determination module 204, for example, may recognize the phrase "Are you" 1008*a* in the first question to determine the first question is a yes/no question. Further, the question determination module 204 may recognize the keyword "Where" 1008*b* in the second question to determine the second question is a location question. In certain embodiments, because there are multiple questions within the message 1004, the multi-question module 308 presents one or more additional selectable response associated with one or more additional questions identified within the parsed message.

Thus, as depicted in FIG. 10, the response presentation module 206 presents a response interface 1010*a* associated with the first yes/no question. In certain embodiments, the interface is located on a "Yes/No" tab 1012*a* of a tabbed interface. In another embodiment, a "Keyboard" tab 1014, which presents a virtual keyboard or other default input method associated with the information handling device 102, is also an element of the tabbed interface. The multi-question module 308, in one embodiment and in response to a response being selected for the first question, presents an additional response interface 1010*b* associated with the second question. As depicted, because the second question is a location question, the multi-question module 308 presents a map that a user may use to select a location to respond to the question. In certain embodiments, the multi-question module 308 presents the map on a "Map" tab 1012*b* located on the tabbed interface. In a further embodiment, the response presentation module 206 populates a response field 1016 with the selected responses, which may be labeled to refer to the questions the responses are associated with, e.g., "Question 1: Yes; Question 2: 100 East 200 North."

Figure 11:
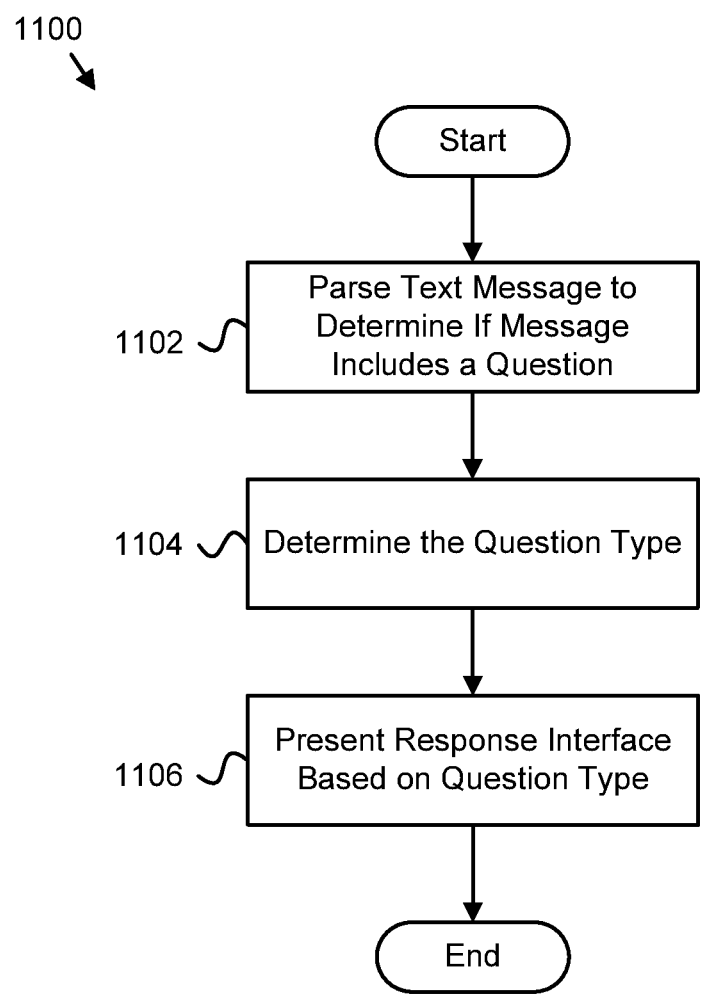
FIG. 11 is a schematic flow chart diagram illustrating one embodiment of a method for an automated messaging response.

FIG. 11 depicts one embodiment of a method 1100 for an automated messaging response. In one embodiment, the method 1100 begins and the message parsing module 202 parses 1102 a textual message to determine whether the message includes a question. In another embodiment, the message is received on an information handling device 102. In certain embodiments, the message parsing module 202 determines one or more sentence boundaries within the sentence. In some embodiments, the message parsing module 202 identifies one or more question identifiers within the message to determine whether the message includes a question.

In a further embodiment, a question determination module 204 determines 1104 a question type for the question. In one embodiment, the question determination module 204 identifies one or more predefined terms, such as keywords and/or phrases, associated with the question type. In certain embodiments, the predefined terms include abbreviations, slang terms, typos, one or more foreign languages, and/or the like. The predefined terms may identify the question type as one of a yes/no question, a date/time question, a location question, a quantity question, a contact question, or the like. While the examples of predefined terms described herein are given in the English language, as representative examples, in other embodiments, the automated response module 104 may be configured to operate in and/or provide automated messaging responses in a different language, in multiple languages, or the like.

In one embodiment, a response presentation module 206 presents 1106 a response interface that includes a plurality of selectable responses to a question. In some embodiments, the selectable responses are associated with the question type determined by the question determination module 204. In certain embodiments, the response presentation module 206 presents a "yes" response and a "no" response for a yes/no question; a date response and a time response for a date/time question; a list of addresses or a map for a location question; a numerical response for a quantity question; one or more contacts for a contact question; and/or the like. And the method 1100 ends.

Figure 12:
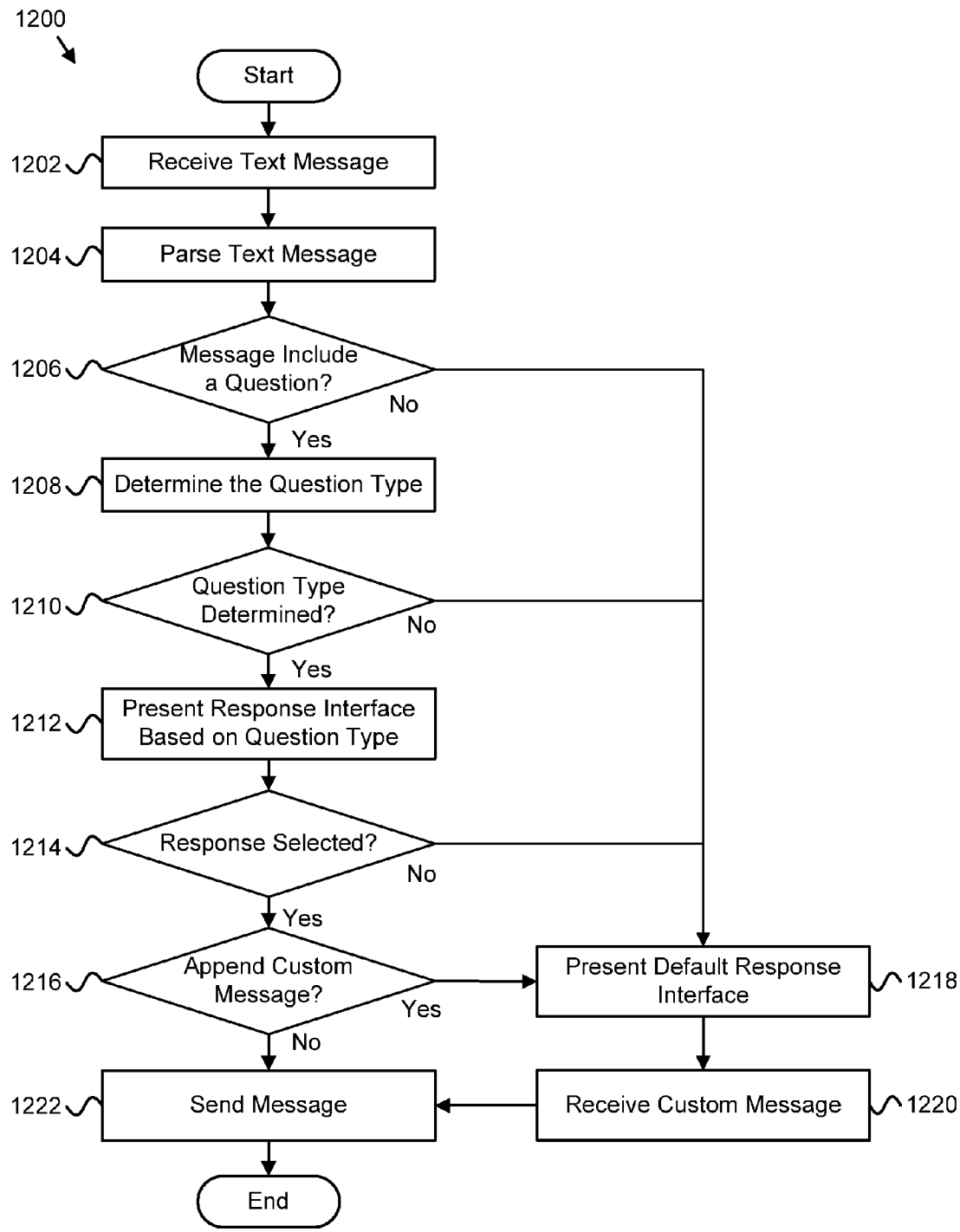
FIG. 12 is a schematic flow chart diagram illustrating one embodiment of another method for an automated messaging response.

FIG. 12 depicts one embodiment of another method 1200 for an automated messaging response. In one embodiment, the method 1200 begins and a message parsing module 202 receives 1202 a text message and parses 1204 the text message to determine 1206 whether the text message includes a question. If the message parsing module 202 determines 1206 the message does not include a question, a default display module 306 presents 1218 the default response interface associated with the information handling device 102. The default display module 306, in certain embodiments, receives 1220 a custom message entered on the default response interface by a user and sends 1222 the message.

In another embodiment, if the message parsing module 202 determines 1206 the message includes a question, a question determination module 204 determines 1208 a question type for a question, such as a yes/no question, a date/time question, a location question, a quantity question, a contact question, and/or the like. If the question determination module 202 does not determine 1210 a question type for the question, a default display module 306 presents 1218 the default response interface associated with the information handling device 102. The default display module 306, in certain embodiments, receives 1220 a custom message entered on the default response interface by a user and sends 1222 the message.

In one embodiment, if the question determination module 204 determines 1210 a question type for the question, a response presentation module 206 presents 1212 a response interface that includes a plurality of selectable responses associated with the question type. In certain embodiments, if the response presentation module 206 determines 1214 a response was not selected by a user, a default display module 306 presents 1218 the default response interface associated with the information handling device 102. In some embodiments, a custom response module 302 presents a response interface for a user to enter a custom response, which may or may not be the same interface as the default response interface. The default display module 306 or the custom response module 302, in certain embodiments, receives 1220 a custom message entered on the default response interface by a user and sends 1222 the message.

In another embodiment, if the response presentation module 206 determines 1214 a response was selected by the user, a text appending module 304 determines 1216 whether the user desires to append a custom message to the selected response. If the text appending module 304 determines the user desires to append a custom message, a default display module 306 presents 1218 the default response interface associated with the information handling device 102. In some embodiments, a custom response module 302 presents a response interface for a user to enter a custom response, which may or may not be the same interface as the default response interface. The default display module 306 or the custom response module 302, in certain embodiments, receives 1220 the custom message from the user, appends the message to the selected response, and sends 1222 the message.

Otherwise, in one embodiment, if the text appending module 304 determines 1216 the user does not desire to append a custom message, the response presentation module 206 sends 1222 the message containing the selected response and the method 1200 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to automate message responses comprising:
   receiving a textual message on a device from a sender;
   parsing the textual message to determine whether the message comprises a question, wherein parsing the textual message further comprises determining one or more sentence boundaries of the message and identifying one or more question identifiers;
   determining a question type for the question;
   selecting, automatically, one of a plurality of graphical response interfaces based on the determined question type;
   presenting the selected response interface, the selected response interface comprising a plurality of selectable responses to the question and a custom-response interface for entering a custom response, wherein the selectable responses are associated with the determined question type, the determined question type comprising:
      a date/time question, wherein the plurality of selectable responses comprises one or more of a date response and a time response based on the one or more question identifiers;
      a location question, wherein the plurality of selectable responses comprises one or more of an address, a location on a map, and a geographic coordinate based on the one or more question identifiers; and
      a contact question, wherein the plurality of selectable responses comprises a set of one or more contacts based on the one or more question identifiers;
   receiving user input from the response interface to create a response selection comprising one or more of the selectable response and the customizable response; and
   sending the response selection to the sender using the device.

2. The method of claim 1, wherein determining the question type comprises identifying one or more predefined terms associated with the question type.

3. The method of claim 2, wherein at least one of the predefined terms comprises one or more of an abbreviation, a typo, and a slang term within the message.

4. The method of claim 2, wherein the one or more predefined terms comprise a predefined sequence of terms associated with the question type.

5. The method of claim 1, further comprising appending user-entered text to a selected response in response to user input.

6. The method of claim 1, further comprising displaying a default response interface in response to determining the message does not comprise a question.

7. The method of claim 1, wherein the one or more selectable responses comprise one or more user-configured responses defined for the question type by a user.

8. The method of claim 1, further comprising presenting one or more additional selectable responses based on the one or more question identifiers.

9. An apparatus to automate message responses comprising:
   a message parsing module configured to parse a textual message to determine whether the message comprises a question, the textual message received on a device from a sender, wherein parsing the textual message further comprises determining one or more sentence boundaries of the message and identifying one or more question identifiers;
   a question determination module configured to determine a question type for the question; and a response presentation module configured to:
    select, automatically, one of a plurality of graphical response interfaces based on the determined question type;
    present the selected response interface, the selected response interface comprising a plurality of selectable responses to the question and a custom-response interface for entering a custom response, wherein the selectable responses are associated with the determined question type, the determined question type comprising:
        a date/time question, wherein the plurality of selectable responses comprises one or more of a date response and a time response based on the one or more question identifiers;
        a location question, wherein the plurality of selectable responses comprises one or more of an address, a location on a map, and a geographic coordinate based on the one or more question identifiers; and
        a contact question, wherein the plurality of selectable responses comprises a set of one or more contacts based on the one or more question identifiers;
    receive user input from the response interface to create a response selection comprising one or more of the selectable response and the customizable response; and
    send the response selection to the sender using the device.

10. The apparatus of claim 9, wherein the question determination module is configured to determine the question type by identifying one or more predefined terms associated with the question type.

11. The apparatus of claim 10, wherein at least one of the predefined terms comprises one or more of an abbreviation, a typo, and a slang term within the message.

12. The apparatus of claim 10, wherein the one or more predefined terms comprise a predefined sequence of terms associated with the question type.

13. The apparatus of claim 9, further comprising a text appending module configured to append user-entered text to a selected response in response to user input.

14. The apparatus of claim 9, further comprising a default display module configured to display a default response interface in response to determining the message does not comprise a question.

15. The apparatus of claim 9, wherein the one or more selectable responses comprise one or more user-configured responses defined for the question type by a user.

16. The apparatus of claim 9, further comprising a multi-question module configured to present one or more additional selectable responses associated with one or more additional questions identified within the parsed message.

17. A system to automate message responses comprising:
a server configured to communicate data between an information handling device and a sender;
a message parsing module configured to parse a textual message received at the information handling device from the sender to determine whether the message comprises a question, wherein parsing the textual message further comprises determining one or more sentence boundaries of the message and identifying one or more question identifiers;
a question determination module configured to determine a question type for the question; and
a response presentation module configured to:
    select, automatically, one of a plurality of graphical response interfaces based on the determined question type;
    present the selected response interface, the selected response interface comprising a plurality of selectable responses to the question and a custom-response interface for entering a custom response, wherein the selectable responses are associated with the determined question type, the determined question type comprising:
        a date/time question, wherein the plurality of selectable responses comprises one or more of a date response and a time response based on the one or more question identifiers;
        a location question, wherein the plurality of selectable responses comprises one or more of an address, a location on a map, and a geographic coordinate based on the one or more question identifiers; and
        a contact question, wherein the plurality of selectable responses comprises a set of one or more contacts based on the one or more question identifiers;
    receive user input from the response interface to create a response selection comprising one or more of the selectable response and the customizable response; and
    send the response selection to the sender using the information handling device.

18. The system of claim 17, further comprising an information handling device, the information handling device comprising at least a portion of one or more of the message parsing module, the question determination module, and the response presentation module.

19. The system of claim 17, wherein the server comprises at least a portion of one or more of the message parsing module and the question determination module and an information handling device comprises at least the response presentation module.

20. A computer program product to automate message responses comprising a non-transitory computer readable storage medium storing machine readable code executable by a processor to perform operations, the operations comprising:
receiving a textual message on a device from a sender;
parsing the textual message to determine whether the message comprises a question, wherein parsing the textual message further comprises determining one or more sentence boundaries of the message and identifying one or more question identifiers;
determining a question type for the question;
selecting, automatically, one of a plurality of graphical response interfaces based on the determined question type; and
presenting the selected response interface, the selected response interface comprising a plurality of selectable responses to the question and a custom-response interface for entering a custom response, wherein the selectable responses are associated with the determined question type, the determined question type comprising:
a date/time question, wherein the plurality of selectable responses comprises one or more of a date response and a time response based on the one or more question identifiers;
a location question, wherein the plurality of selectable responses comprises one or more of an address, a location on a map, and a geographic coordinate based on the one or more question identifiers; and a contact question, wherein the plurality of selectable responses comprises a set of one or more contacts based on the one or more question identifiers;

receiving user input from the response interface to create a response selection comprising one or more of the selectable response and the customizable response; and sending the response selection to the sender using the device.

21. The computer program product of claim 20, the operations further comprising appending user-entered text to a selected response in response to user input.

* * * * *